Oct. 26, 1954 J. A. HANLEY 2,692,736

TAPE GUIDE FOR PRODUCTION OF MAGNETIC SOUND TAPE

Filed Dec. 21, 1950 2 Sheets-Sheet 1

INVENTOR
John A. Hanley

BY Pennie, Edmonds, Morton & Barrows

ATTORNEYS

Oct. 26, 1954 J. A. HANLEY 2,692,736

TAPE GUIDE FOR PRODUCTION OF MAGNETIC SOUND TAPE

Filed Dec. 21, 1950

2 Sheets-Sheet 2

INVENTOR
John A. Hanley

BY
Pennie, Edmonds, Morton & Barrows
ATTORNEYS

Patented Oct. 26, 1954

2,692,736

UNITED STATES PATENT OFFICE 2,692,736

TAPE GUIDE FOR PRODUCTION OF MAGNETIC SOUND TAPE

John A. Hanley, Noroton, Conn., assignor to Audio Devices, Inc., New York, N. Y., a corporation of New York Application December 21, 1950, Serial No. 201,990

11 Claims. (Cl. 242—76)

This invention relates to the production of magnetic sound recording tape and the like and has for its object more particularly improvements in the method of and apparatus for spacing a plurality of pieces of tape after they have been cut from a tape base and before they are wound simultaneously into separate rolls.

Copending applications, Serial Nos. 201985 (now Patent No. 2,645,270) and 201,986, filed December 21, 1950, simultaneously herewith, disclose a method of and apparatus for advancing tape base coated with finely divided magnetic material from a roll in a charging zone to a main cutting or slitting zone; the tape base is cut lengthwise into a plurality of narrow pieces of tape as it moves through the cutting zone. The pieces of tape are gripped and advanced through a gripping zone and are separated and spaced from one another in a separating and spacing zone; after which the spaced pieces of tape move into a winding zone where they are wound simultaneously into separate rolls.

Certain difficulties are encountered in the winding zone where the spaced pieces of tape are wound simultaneously into a plurality of rolls. To this end a plurality of hubs or reels are mounted on a power driven shaft, their number corresponding to the number of pieces of tape to be wound thereon. The hubs or reels are made of various materials, such as a plastic or metal. No matter how carefully they are made, variations in their overall width occur. That is to say, neither the hubs nor the reels are precisely the same in width. While the difference in width of two selected hubs or reels, for example, may be fairly small, the sum of such differences can be quite large when a bank of the hubs or reels, for example 22, is employed. The overall width of such a bank, and hence the precise individual position of each hub or reel in the bank, cannot be predicted with certainty.

Hence, it becomes a problem how to space the pieces of moving tape with respect to each other so that each piece of tape may be wound accurately into a roll on its own hub or reel. If one or more pieces of tape is not properly centered on its hub or reel, damage may occur immediately or later to the tape for that reason.

In the case of the hub, the pieces of tape will not wind into a roll with smooth sides. Tape edges will protrude from the side. Even though slightly, the protruding edge portions are subject to damage as the roll is handled normally; say when the roll is placed on a flat surface or is bumped against a physical object, such as in its container or on the turntable of a sound-recording machine. In the case of a reel, the piece of tape will strike or scrape the rim or peripheral edge of the sides of the reel during the winding operation, thus causing damage to the edge portions of the tape.

Investigation has led to the discovery that the pieces of tape may be spaced in such a manner as to be centered accurately as they approach and are wound on the hubs or reels. Such variations as occur in overall width of the hubs or reels when formed in a bank may be readily accounted for in the centering of the pieces of tape. The spacings between all of the pieces of tape may be adjusted simultaneously to center each piece of tape with respect to its own hub or reel.

These and other features of the invention will be better understood by referring to the accompanying drawings, taken in conjunction with the following description, in which.

Figures 1, 2, 6, 7:
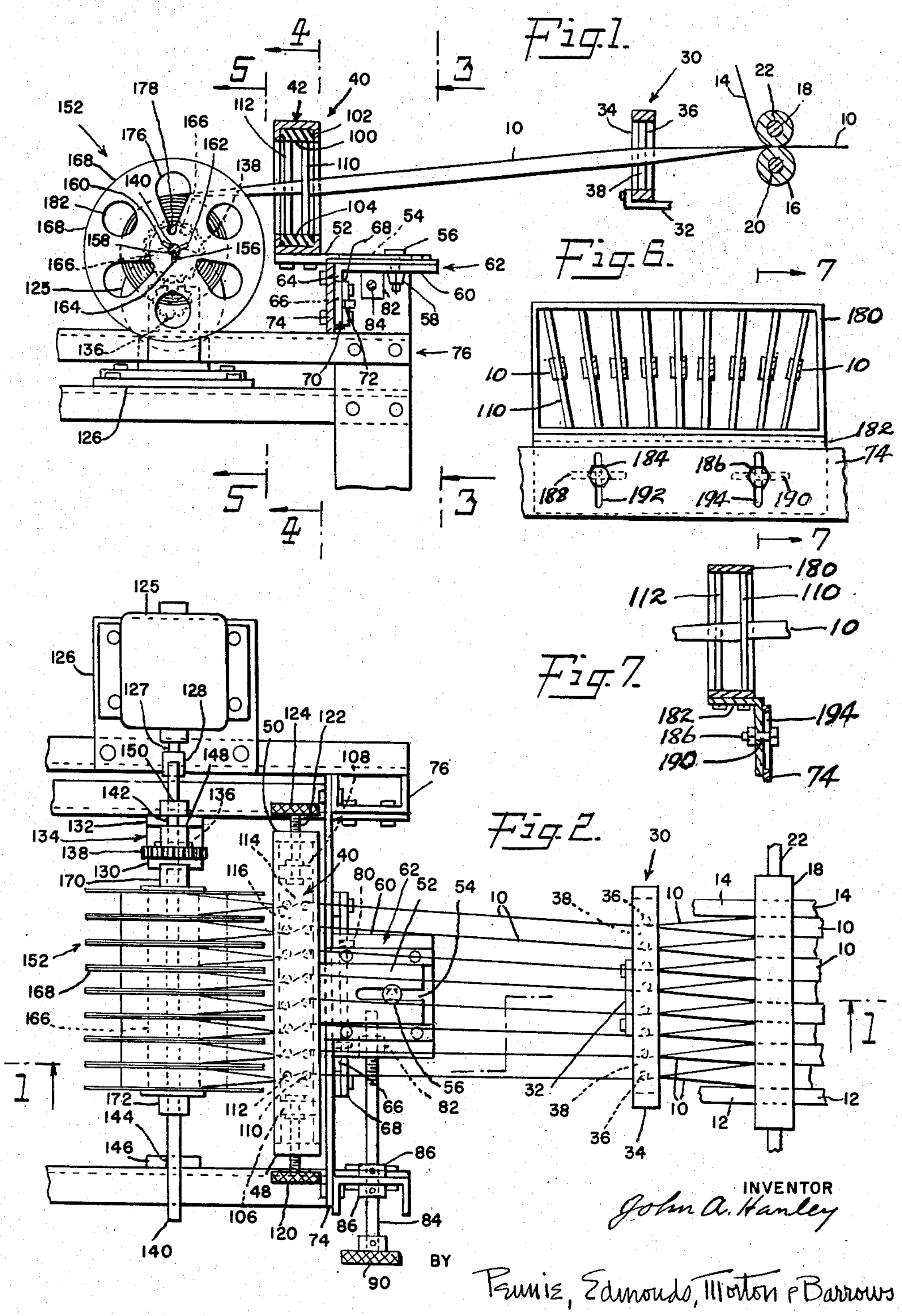
Fig. 1 is a side elevation in section on the line 1—1 of Fig. 2, showing an apparatus illustrative of a practice of the invention.
Fig. 2 is a plan view.
Fig. 6 is a front elevation and Fig. 7 a section on the line 7—7 of Fig. 6 of a modified form of apparatus.

Referring to Figs. 1 and 2, a plurality of inner pieces 10 of cut or slit pieces of tape base coated solely on one side with finely divided magnetic material and outer marginal edge portions 12 and 14 of the tape base from a cutting or slitting zone, not shown, pass flatly through a pair of gripping rollers 16 and 18, mounted integrally on lower and upper shafts 20 and 22, the latter of which is power driven. The outer marginal edge portions are discarded. The inner pieces only are retained and further processed in accordance with the present invention. In a present practice a tape base of convenient width for handling and for giving a plurality of tapes is used. A tape base six inches wide is cut into twenty-two pieces of tape, not including the discarded marginal edge portions.

The pieces of tape are passed from the gripping rollers through a first separator or "comb" 30 formed of a lateral support 32 directly forward of the cutting zone and a vertically disposed rectangular frame 34 securely mounted on the far end of the support, in the normal path of travel of the pieces of tape. The frame consists of top, bottom and end pieces fastened to each other. A plurality of spaced rods 36, extend vertically of the frame, the lower ends of the rods being secured to the bottom and the upper ends to the top of the frame. The spacing of the rods provides a vertical space 38 between adjacent rods, through which the pieces of tape pass. Since this arrangement of the rods resembles more or less the teeth of a comb, the device is referred to by the operators as a "comb."

Whereas the pieces of tape come through the gripping rollers disposed flatly and horizontally, they pass into spaces 38 in sliding contact with the intermediate or mid-portions of the vertical rods in a vertically disposed position. In other words, the pieces of tape are given a half turn as they enter spaces 38. The pieces of tape are advanced in this manner to eliminate lash, so that they will not become jammed between the rods, and so that their edges will not rub against the rods, or the top and the bottom of the frame—thus preventing damage to the pieces of tape.

Figure 3:
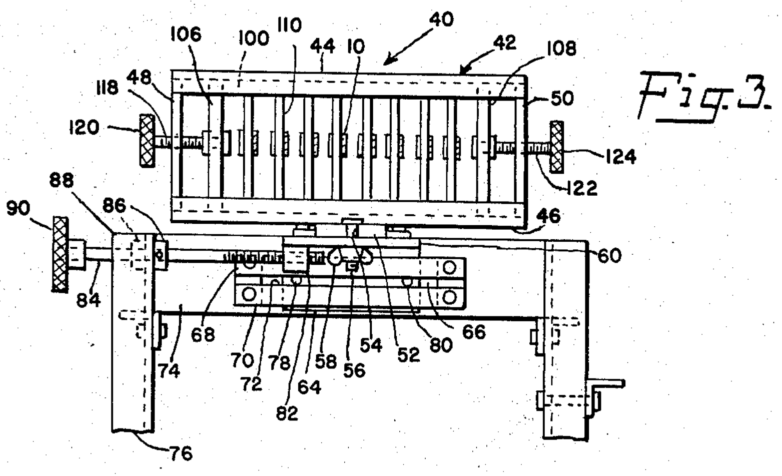
Fig. 3 is an end view on the line 3—3 of Fig. 1.
Figure 4:
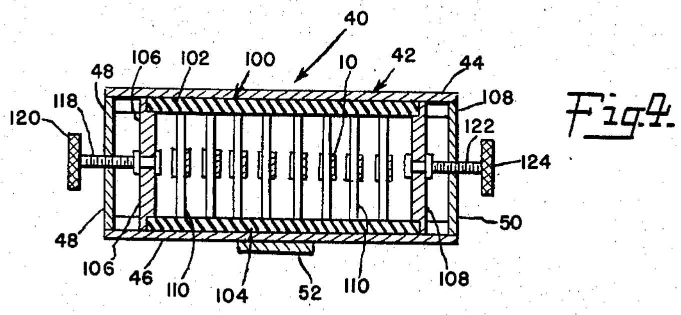
Fig. 4 is a section on the line 4—4 of Fig. 1.

The vertically disposed pieces of tape spread out laterally a limited amount (Fig. 2), and pass to and through a second separator 40 or comb—which functions in somewhat the same manner as the first separator or comb, although it differs substantially in construction because of certain highly useful adjustable features which permit it also to function somewhat differently than the first "comb." As shown to better advantage in Figs. 3 and 4 particularly, it is in the form of a rectangular outer frame 42 having a top 44, a bottom 46 and two ends 48 and 50. The outer frame (see also Fig. 1) is secured at its bottom to a flat rearwardly extending support 52 having a centrally disposed slot 54 also extending rearwardly fitted with a bolt 56 and a wing nut 58. The bolt extends downwardly into a hole in the top leg 60 of a slidable angle support 62. The lower leg 64 (Figs. 1 and 3) depends loosely in an inner slot 66 disposed behind a pair of spaced outer horizontal members 68 and 70. The two outer members are spaced from one another in parallel relationship to provide a horizontal outer slot 72, which communicates with the inner slot.

The spaced members are not only spaced from each other as one views Fig. 3, for example, but they are spaced from and secured to a back support 74 fastened to frame 76. A pair of spaced rods 78 and 80 is secured to lower leg 64 of the angle support, the rods extending through outer slot 72. A holding block 82 (Figs. 1 and 3) is secured to the under left side of top leg 60. The inner end of a threaded rod 84 is secured rotatably in a threaded hole in the holding block. The rod extends (Fig. 3) through collars 86 attached to the rod on opposite sides of a side member 88 of the frame, and terminates in a knurled hand wheel 90.

It will be seen from this construction that the turning of the hand wheel is adapted to move outer frame 42 of the second separator or comb 40 laterally to the left or right, as one views Figs. 2 and 3. This lateral movement, of course, also moves the second separator or comb relatively to the first separator or comb 30 (Figs. 1 and 2) to the rear as well as to the tape winding or reeling zone to the front. When the second separator or comb is placed in proper relation to the first separator or comb and to the tape winding or reeling zone, wing nut 56 (Figs. 1 and 3) is fastened on bolt 54.

Now, referring particularly to Fig. 4, it will be noted that the second separator or comb 40 also includes an inner frame 100 fitting slidably inside outer frame 40. The inner frame is formed of a rubber top 102, a rubber bottom 104 and metal ends 106 and 108. To function in the manner to be described below, the ends of the rubber top and bottom are secured integrally to the adjacent metal ends in any suitable manner, such as by bonding or clamps and the like, not shown. As in the case of the first separator or comb 30, the inner frame of the second separator or comb is provided with a plurality of closely spaced pairs of spaced vertical rods 110 and 112, arranged in two spaced parallel rows, the lower ends of the rods being secured to rubber bottom 104 and the upper ends of the rods being secured to rubber top 102. The spacing of the rods (Fig. 2) results in a vertical space 114 between each pair of rods and a space 116 between adjacent pairs of rods, through which the pieces of tape may pass in a zigzag manner, in sliding contact with the vertical rods, as shown. One end of a threaded rod 118 extends through and is rotatably secured to metal end 106 of the inner frame. The rod extends through a threaded hole in end 48 of outer frame 40. The rod terminates in a knurled hand wheel 120. In a similar manner, one end of a threaded rod 122 extends through and is rotatably secured to metal end 108 of the inner frame. The rod extends through a threaded hole in end 50 of outer frame 40. The rod terminates in a knurled hand wheel 124.

The construction of the inner frame is such as to make it horizontally expansible and contractible. From this it follows that spaces 114 between each pair of rods 110 and 112 and spaces 116 between adjacent pairs of rods are expansible and contractible. Thus, when hand wheel 120 or 124, or both, are turned to stretch rubber top 102 and rubber bottom 104, pairs of rods 110 and 112 are separated still farther. As this occurs spaces 116 between the adjacent pairs of rods necessarily are increased in width; and that, at the same time, spaces 114, are decreased in width. On the other hand, when hand wheel 120 or 124, or both are turned to compress the rubber top and the rubber bottom rods 110 and 112 in each row are brought closer to each other, thereby decreasing the width of spaces 116, and increasing the width of spaces 114. The adjustable width of the latter spaces 114, however, is not of primary importance because they function essentially to keep the flat faces of the pieces of tape base vertically disposed and this does not depend on the adjustability of width of the spaces. The adjustable width of the former spaces 116, however, is of considerable importance, as will be explained below.

To summarize at this point, it will thus be seen from the construction shown and described that the operator has a good deal of leeway in manipulating the second separator or comb. He can move it laterally to the left or right with turn wheel 90, to adjust its position relative to the first separator or comb as well as to the tape winding or reeling zone; he can also increase or decrease the width of spaces 116 through which the pieces of tape zigzag to the winding zone. As with the first separator or comb, the flat faces of the pieces of tape are passed vertically, rather than horizontally, through spaces 116, the flat faces of each piece of tape thus being brought in zigzag sliding or wiping contact with its pair of vertical rods 110 and 112.

On passing through the second tape separator or comb, the pieces of tape enter the winding or reeling zone. As more particularly shown in Figs. 1, 2 and 5, the apparatus includes a torque motor 125 secured to a bracket 126 attached to frame 76. Its drive shaft 127 communicates with a coupling 128 connecting with a driven shaft 129 extending through the side of the frame and being supported in bearings in arms 130 and 132 of a bifurcated yoke 134, the base of which is suitably attached to the inside of the frame at its top. A drive gear 136 is integrally mounted on the shaft inwardly of and adjacent to the left arm 130 of the yoke, as one views Fig. 5.

The drive gear in turn meshes with a driven gear 138 integrally mounted on an upper removable shaft 140 resting by gravity at its right end in a slot 142 (Fig. 2), in the upper portion of the right and higher arm 132 of the yoke, and at its left end in a similar slot 144 (Fig. 2) in a bracket support 146 secured to the opposite side of the frame. The shaft is provided (Fig. 5) at its right end with two integrally secured spacers 148 and 150 adjacent right arm 132 of the yoke to keep gears 136 and 138 in mesh.

A plurality of reels 152 is mounted on shaft 140. They are kept in alignment (Figs. 2 and 5) and locked on the shaft by a key 156. The shaft itself and its key fit in a corresponding shaft hole 158 and in one of three slots 160, 162 and 164 (the latter as shown in Fig. 1) in the hub portions 166 of the side walls 168 of the reels. The reels are also kept in contact with each other on the shaft (Figs. 5 and 2) by a fixed retainer flange 170, with a rod hole, not shown, integrally secured on its right end, adjacent gear 138, and a removable retainer flange 172, with a rod hole, not shown, on its left end.

Referring more especially to Fig. 1, it will be noted that the side walls or flanges 168 of each reel are provided with a pair of complementary pear-shaped holes 176, the lower or smaller ends of which merge into a complementary hub slot 178, extending into the peripheral portions of the hub.

Figure 5:
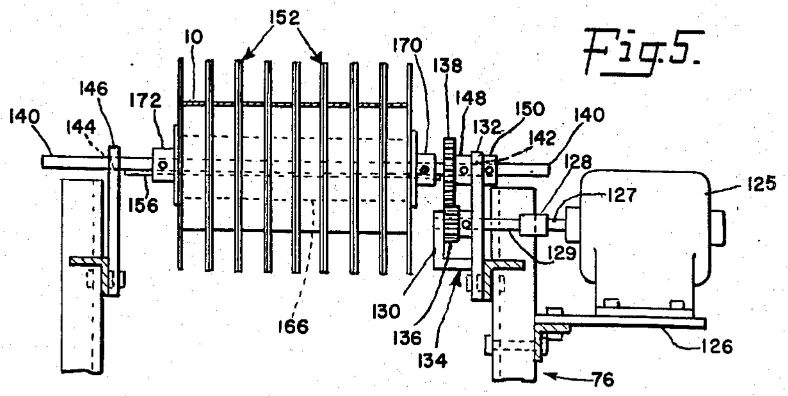
Fig. 5 is a section on the line 5—5 of Fig. 1.

When mounting a plurality of the reels 152 on shaft 140, for example as shown in Figs. 2 and 5, they are so placed that hub slots 178 of all of the reels are in alignment with each other. A retaining rod is then inserted through the pear-shaped holes and the far end is pushed into the rod hole of flange 170. The near end of the retaining rod is then pushed into the rod hole of flange 170. The slots are sufficiently deep to accommodate the retaining rod so that its top surface is substantially in circumferential alignment with the exterior surfaces of the hubs in the reels.

In addition to a pear-shaped hole in each side wall or flange, which can be aligned with each other, the flanges are provided with additional holes 182 which may likewise be aligned. They reduce the weight of the reels and are also in effect peep-holes to determine the amount of tape on the reel. They may also be used for the insertion of shears to cut the tape, as is explained in the copending applications.

It may be assumed at this stage that reels 152 are mounted on shaft 140; that their slots are aligned at the top; that retainer flanges 170 and 172 are secured to the shaft to hold the reels in contact with each other; and that the operator has placed the shaft in slots 142 and 144 (Figs. 2 and 5). The forward ends of the pieces of tape 10 extending beyond second separator or comb 40 are then given a half turn and placed in the reels over their respective hubs and slots. The ends of the pieces of tape extend over the slots preferably several inches.

A retaining rod, not shown, is then passed laterally through aligned pear-shaped holes 176, over the pieces of tape; its far end is pushed into the rod hole of flange hole 170; the rod is pushed downwardly into the hub slots, and the near end of the rod is inserted in the rod hole of flange 172. This causes a portion of each piece of tape to be pushed downwardly in its hub slot. Since the retaining rod fits fairly tightly in the slots as it bears against the depressed portions of the pieces of tape, it maintains its position as shaft 140 and reels 152 are rotated for the tape winding operation. After a few turns the pieces of tape are securely fastened to the hubs of the reels, and the rods may be withdrawn.

As one views Fig. 1, the shaft and hence the reels rotate anti-clockwise. When this occurs, the ends of the pieces of tape tend to drop away from the hub; and the main portions of the pieces of tape are wound against the hub until the reels make a complete revolution, after which the main portions of the pieces of tape bear down on and lock the ends during the second revolution of the reels.

The speed at which the machine is operated depends on a number of factors, including the skill of the operator. If the coated tape base itself is in optimum condition, so that objectionable sections need not be cut out, and splicing for that reason is not required, or if such objectionable sections are few and far apart, the machine itself may be run quite rapidly.

Among the improvements which permit rapid running of the machine are separators or combs 30 and 40. The manner in which the former is positioned with respect to the tape gripping rollers and the latter with respect to the shaft-reel assembly cause them also to function as aligners to the rollers and the reels as well as to each other. While a shaft-reel assembly is specifically shown, it will be clear that a shaft-hub assembly may be used. That is to say, the pieces of tape may be wound on hubs having no side flanges. What is then produced may be considered rolls, instead of reels, of tape. If the separators were not interposed between the rollers and the reels or hubs, the rapidly moving pieces of tape would tend to have a good deal of lash or bounce, laterally and vertically, which would greatly impair the winding operation. The lashing or bouncing pieces of tape would tend to overlap, and to interlock with, each other to their damage. They would be apt to tear or become otherwise damaged as they enter the winding zone. Lashing or bouncing of the pieces of rapidly moving tape against the peripheral edges of the side flanges of the reels, as well as against the side walls of the flanges, would damage the coating on the pieces of tape and would cause the pieces of tape to wind irregularly, thus resulting in rolls of tape with irregular rather than smooth side surfaces. Much the same result would obtain if the pieces of tape were wound into rolls on hubs without side flanges. Such irregular side surfaces would in turn cause irregularities in the unwinding of the tape from the roll in subsequent sound-recording operations and thus would impair the quality of the recording.

While the use of a simple separator or comb with vertical or upright rods in straight line alignment with each other is of some help in overcoming disadvantages of the kind enumerated, when the machine is not operated rapidly, it is not adequate when the machine is operated rapidly. The pieces of tape then develop an objectionable lash or bounce in the space between the second separator and the reels or hubs, as well as between the rollers and the first separator.

In accordance with the present practice, however, such lash or bounce of the pieces of tape is inhibited and prevented. As already described and as shown in the drawings, each separator is provided with vertical rods between which the pieces of tape are strung. The first separator or comb has a single row of closely spaced rods 36 that function to give the pieces of tape a half turn, so that as they advance to the second separator or comb their flat faces are in spaced substantially parallel and vertical relationship to each other. As the pieces of tape pass through spaces 38 between the rods at least one of the flat faces of the pieces of tape tends to slide or wipe against an adjacent vertical rod.

To inhibit or prevent lash or bounce of the pieces of tape as they enter the winding zone to be wound on hubs with flanges (reels), or on hubs without flanges, the second separator or comb is differently constructed. As already pointed out it contains two rows of aligned vertical rods 110 and 112 extending transversely across the path of travel of the pieces of tape. A pair of the rods, that is one rod in one row and one complementary rod in the other row, directly opposite each other in the rows, are utilized in order to obtain this desirable result. Each piece of tape is strung through its pair of rods in a zigzag manner. This causes both flat faces of each piece of tape to slide or wipe against intermediate side portions of its pair of rods and therefore results in a form of gripping action. The gripping action is sufficiently strong to inhibit or prevent lash or bounce of the pieces of tape, and at the same time sufficiently weak to permit them to advance freely in their path of travel to the winding zone.

In order to get optimum results, the second separator or comb is placed near the winding zone; its position depending somewhat on the size of the hubs or reels and, therefore, on the size of the rolls of tape to be wound thereon. As a result of the gripping action between the pieces of tape and the rods, the movement of each piece of tape from the separator to the winding zone is extremely steady. It is so steady that relatively large rolls of tape may be wound with substantially smooth side surfaces on hubs without side flanges. On the other hand, if side flanges or reels are employed, the pieces of tape enter them for winding so steadily as not to be damaged by the side flanges or their peripheral edges.

As already noted, the second separator or comb is adjustable with respect to the winding zone along the path of travel of the pieces of tape; and it is also adjustable laterally with respect to the spaces between the pairs of rods. The latter feature is particularly important because of the variations in width of the hubs and reels. The thickness of the metal or plastic going into the hubs and reels is apt to vary, thus causing a variation in their widths. Such variations are, of course, multiplied when a bank of hubs or reels is mounted on a single shaft. In a present practice twenty-two hubs or reels make up a bank, although a larger number may be employed. In any event, the construction of the second separator or comb readily permits simultaneous lateral adjustment of the spacings between the pairs of rods with respect to the spacings of the hubs or reels so that the pieces of tape advance directly thereto.

As also noted above, the pieces of tape between the separator and the winding zone are given a half turn as they are fastened to the hubs or reels. The direction of turn will depend on whether the coating of magnetic material is to be on the top or bottom of the pieces of tape.

Referring to the modification shown in Figs. 6 and 7, it will be noted that rods 110 and 112 are securely mounted in frame 180 integrally resting on an angle support 182 adjustably secured to back support 74 by means of bolts 184 and 186 extending through transverse slots 188 and 190 in the angle support and vertical slots 192 and 194 in the back support. Whereas all of the rods are vertically spaced in the other modifications, in this one they are spaced fanwise from bottom to top, in opposite directions from the center toward the ends of the frame. This is shown in somewhat exaggerated form for purposes of illustration. In practice the slant or inclination of the rods need not be so marked, and the slant or inclination may fan out from the top toward the bottom.

In accordance with this arrangement, the spaces between adjacent pairs of rods become gradually wider from bottom to top. This means that an overall transverse spacing of the pairs of rods may be selected in a transverse area between the bottoms and tops of the rods, and in the normal path of travel of the pieces of tape, that corresponds to the overall transverse spacing of bank of reels or hubs 152 so that each piece of tape 10 may be diverted directly into its reel or onto its hub. The optimum transverse area for the purpose is readily obtained by lowering or raising the frame, and by moving the frame to the right or left, relatively to the back support, as required, and then fastening bolts 184 and 186.

While the production of magnetic sound-recording and sound-reproducing tape has been emphasized, it will be appreciated that the practice of the invention is applicable to the production of a variety of similarly shaped products, such as uncoated tape, tape otherwise coated, leaders, bands, ribbons, etc. This may be in connection with the magnetic tape itself such as in the production of leaders to be attached to one or both ends of a piece of magnetic tape. A sheet of the leader material may be cut or slit into a plurality of leaders, passed through the separator and wound into rolls from which pieces are cut, as leaders, as required.

It will be clear to those skilled in this art that the above is only by way of illustrating a practice of the invention and that the invention readily lends itself to a number of useful modifications.

I claim:

1. In apparatus for producing sound-recording and sound-reproducing magnetic tape by cutting or slitting a relatively long and narrow base coated with finely divided magnetic material into a plurality of pieces of tape as it moves in a predetermined path of travel from a charging device through a cutting or slitting device and the cut pieces of tape move at the same time through a separating-spacing device to a winding device containing a plurality of hubs, mounted on a power driven shaft, on which they are wound simultaneously into separate rolls, the improvement comprising a separating-spacing device formed of a plurality of spaced pairs of spaced guide rods aligned in two rows to be placed in the path of travel of the cut pieces of tape, the rods being secured at their ends to resilient members, and adjustable means connecting the ends of the resilient members for placing simultaneously and maintaining the members and the pairs of rods in such a position that the spaces between the pairs of rods may be accurately aligned with the hubs.

2. Apparatus according to claim 1, in which the resilient members are in the form of material that is stretchable and contractible.

3. Apparatus according to claim 1, in which the resilient members form the top and bottom of a frame, and the adjustable means are secured to the ends of the frame.

4. Apparatus according to claim 1, in which the resilient members are stretchable and contractible material and form the top and bottom of a frame, and the adjustable means are secured to the ends of the frame.

5. Apparatus according to claim 1, in which the resilient members form the top and bottom of an inner frame fitting within an outer frame, and the adjustable means are secured to at least one of the ends of the inner frame and are securable to an end of the outer frame so that the inner frame may be expanded and contracted within and relatively to the outer frame.

6. Apparatus according to claim 1, in which the resilient members are stretchable and contractible material and form the top and bottom of an inner frame fitting within an outer frame, and the adjustable means are secured to at least one of the ends of the inner frame and are securable to an end of the outer frame so that the inner frame may be expanded and contracted within and relative to the outer frame.

7. Apparatus according to claim 1, in which the resilient members form the top and bottom of an inner frame fitting within an outer frame; the adjustable means are secured to at least one of the ends of the inner frame and are securable to an end of the outer frame so that the inner frame may be expanded and contracted within and relative to the outer frame; and adjustable means associated with the outer frame for moving the two frames as a unit longitudinally and laterally in the path of travel with respect to the hubs of the winding device.

8. Apparatus according to claim 1, in which the resilient members are stretchable and contractible material and form the top and bottom of an inner frame fitting within an outer frame; the adjustable means are secured to at least one of the ends of the inner frame and are securable to an end of the outer frame so that the inner frame may be expanded and contracted within and relative to the outer frame; and adjustable means associated with the outer frame for moving the two frames as a unit longitudinally and laterally in the path of travel with respect to the hubs of the winding device.

9. Apparatus according to claim 1, in which the resilient members form the top and bottom of an inner frame fitting within an outer frame; the adjustable means include a threaded rod extending through a threaded hole in an end of the outer frame, the inner end of the threaded rod is rotatably secured to the adjacent end of the inner frame and hand gripping means are provided at the other end of the rod for turning it to expand and contract the inner frame relatively to the outer frame.

10. Apparatus according to claim 1, in which the resilient members form the top and bottom of an inner frame fitting within and supported by an outer frame; the adjustable means include a threaded rod extending through a threaded hole in each end of the outer frame, the inner end of each threaded rod being rotatably secured to the adjacent end of the inner frame; and hand gripping means at the other end of each threaded rod for turning it to expand and contract the inner frame relatively to the outer frame.

11. In the method of producing magnetic sound-recording and sound-reproducing tape by cutting a relatively long and narrow tape base coated with finely divided magnetic material into a plurality of pieces of tape as it moves in a predetermined path of travel from a charging zone through a cutting zone and the cut pieces of tape move at the same time through a separating-spacing zone to a winding zone where they are wound simultaneously into separate rolls, the improvement which comprises passing each piece of tape in a generally horizontal direction through the separating-spacing zone with its flat faces facing the flat faces of adjacent pieces of tape in upright planes and in zig-zag sliding contact with a pair of upright guide rods secured at their ends to resilient supports and spaced relatively close to each other in the path of travel to steady its movement as it advances to its roll; partially turning the pieces of tape as they leave the separating-spacing zone so that their flat faces are in a generally horizontal plane; and adjusting simultaneously the spacings between the pieces of tape by placing the resilient supports under tension or compression, as required, until they are brought into accurate alignment with the spacings of the rolls on which the pieces of tape are to be wound.

References Cited in the file of this patent

UNITED STATES PATENTS

| Number | Name | Date |
|---|---|---|
| 1,602,447 | Olson | Oct. 12, 1926 |
| 1,958,692 | Besal et al. | May 15, 1934 |
| 2,031,430 | Schletter | Feb. 18, 1936 |
| 2,060,269 | Wikle | Nov. 10, 1936 |
| 2,194,879 | Mihaly et al. | Mar. 26, 1940 |
| 2,358,654 | Nordberg | Sept. 19, 1944 |